(12) United States Patent
Khatri (10) Patent No.: US 12,117,957 B2
(45) Date of Patent: Oct. 15, 2024

(54) VEHICULAR SENSOR TESTING SYSTEM WITH STANDARDIZED I2C COMMUNICATION

(71) Applicant: Magna Electronics Inc., Auburn Hills, MI (US)

(72) Inventor: Jaidev Khatri, Rochester Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 437 days.

(21) Appl. No.: 17/249,040

(22) Filed: Feb. 18, 2021

(65) Prior Publication Data

US 2021/0255984 A1    Aug. 19, 2021

Related U.S. Application Data

(60) Provisional application No. 62/978,474, filed on Feb. 19, 2020.

(51) Int. Cl.
*G06F 13/42*   (2006.01)
*G06V 20/56*   (2022.01)

(52) U.S. Cl.
CPC ........ *G06F 13/4282* (2013.01); *G06V 20/56* (2022.01); *G06F 2213/0016* (2013.01)

(58) Field of Classification Search
CPC ......... G06F 13/4282; G06F 2213/0016; G06F 18/00; G06V 20/56; G06V 20/588; G06V 20/58; G06V 20/582; G06V 20/584; G06V 20/586; B62D 15/025; G01S 19/45; G06T 7/73; G06T 2207/30256; G06T 2207/10016; G06T 2207/10024; G06T 2207/10028; G06T 2207/30196; G06T 7/70; H04N 5/374
USPC ........................................................ 370/463
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |

(Continued)

OTHER PUBLICATIONS

I. Vido, I. Škorić, D. Mitrović, M. Milošević and M. Herceg, "Automotive Vision Grabber: FPGA design, cameras and data transfer over PCIe," 2019 Zooming Innovation in Consumer Technologies Conference (ZINC), Novi Sad, Serbia, 2019, pp. 103-108, doi: 10.1109/ZINC.2019.8769348. (Year: 2019).*

*Primary Examiner* — Mohammad S Adhami
*Assistant Examiner* — Jesse P. Samluk
(74) *Attorney, Agent, or Firm* — HONIGMAN LLP (57) ABSTRACT

A method for testing a sensor of a vehicular sensing system includes displaying, by a processor, a test generation interface on a display screen, and receiving, by the processor, a user input based on a user interacting with the test generation interface. The method includes determining a plurality of parameters based on the user input. The method includes generating a test script based on the parameters that includes at least one test message for performing at least one system test. The method includes transmitting generated test script to a host adapter in communication with the sensor. Responsive to receiving the generated test script, the method includes transmitting, by the host adapter, the test message to the sensor to test the sensor.

16 Claims, 9 Drawing Sheets

(56) References Cited

U.S. PATENT DOCUMENTS

| | | | |
|---|---|---|---|
| 7,720,580 B2 | 5/2010 | Higgins-Luthman | |
| 7,855,755 B2 | 12/2010 | Weller et al. | |
| 10,071,687 B2 | 9/2018 | Ihlenburg et al. | |
| 10,099,614 B2 | 10/2018 | Diessner | |
| 10,134,286 B1* | 11/2018 | Elswick | G08G 1/205 |
| 10,841,571 B2 | 11/2020 | Sigle | |
| 2014/0016479 A1* | 1/2014 | Coomber | H04L 43/50 370/252 |
| 2019/0020499 A1* | 1/2019 | Meier | H03M 13/09 |
| 2019/0138432 A1 | 5/2019 | Nagaraj et al. | |
| 2020/0256951 A1 | 8/2020 | Kunkel | |
| 2020/0408921 A1* | 12/2020 | Oh | G01D 3/08 |
| 2021/0142073 A1 | 5/2021 | Ustunel | |
| 2021/0201056 A1 | 7/2021 | Potnis | |

\* cited by examiner

VEHICULAR SENSOR TESTING SYSTEM WITH STANDARDIZED I2C COMMUNICATION

CROSS REFERENCE TO RELATED APPLICATION

The present application claims the filing benefits of U.S. provisional application Ser. No. 62/978,474, filed Feb. 19, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a method for testing a driving assistance system or vision system or sensing system for a vehicle that utilizes one or more sensors such as one or more cameras (preferably one or more CMOS cameras) to capture image data representative of images exterior of the vehicle. The method includes displaying, by a processor of a user device, a test generation interface on a display screen of the user device and receiving, at the processor, a user input based on a user interacting with the test generation interface. The method also includes determining, by the processor, and based on the received user input, a plurality of parameters of at least one system test. The method includes generating, by the processor, a test script based on the determined plurality of parameters of the at least one system test, wherein the test script includes at least one test message for performing the at least one system test. The method also includes transmitting, by the processor, the generated test script to a host adapter in communication with the sensor of the vehicular sensing system, and, responsive to receiving the generated test script, transmitting, by the host adapter, the at least one test message to the sensor of the vehicular sensing system to test the sensor of the vehicular sensing system.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
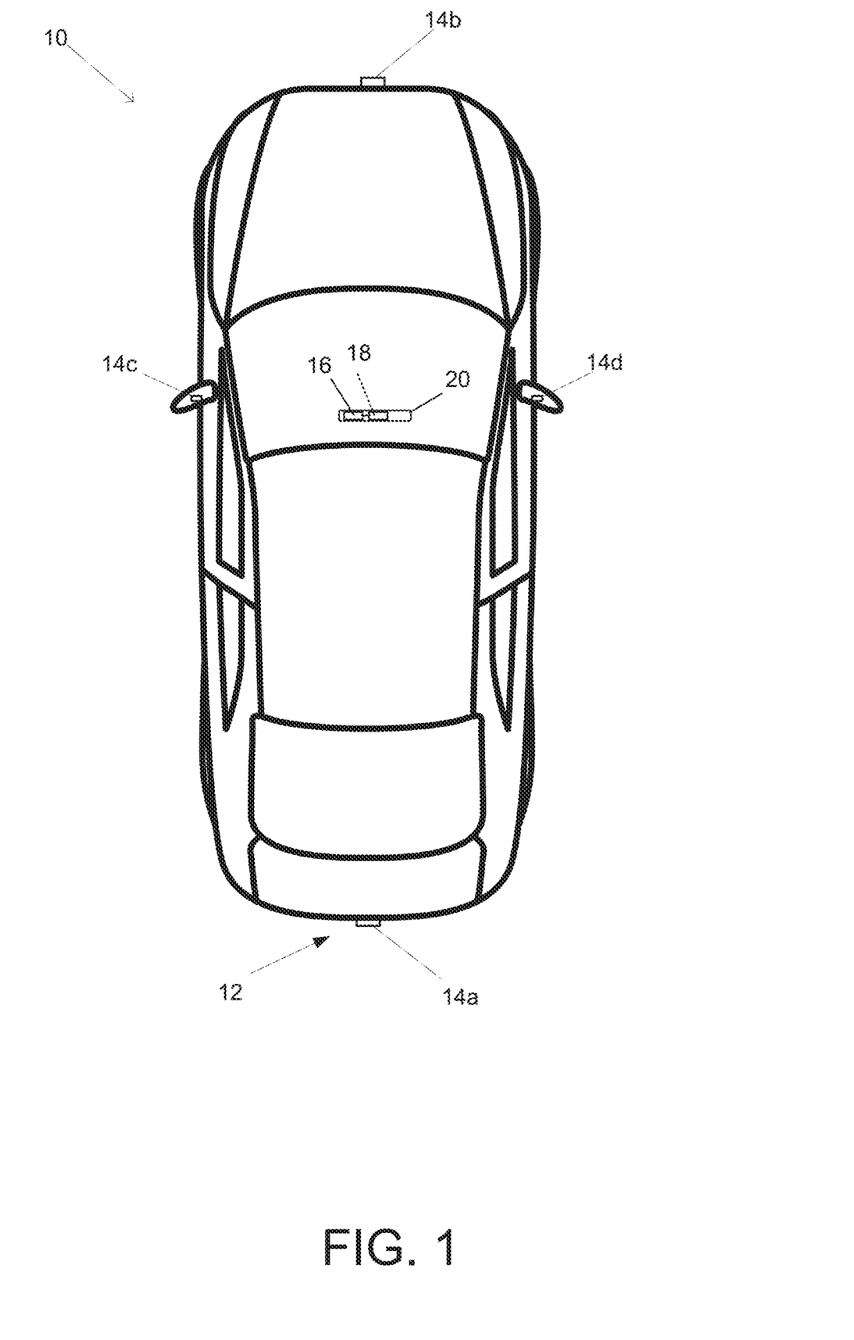
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Components of the vision system 12 (e.g., cameras 14) are often tested using a serial bus, such as Inter-Integrated Circuit (I2C) bus. For example, I2C may be used for communication between a microprocessor/image signal processor of the camera and a testing station configured to test and/or calibrate the camera by enabling features, reading/writing register values, and so on. A testing system described herein provides utilization of I2C (or other serial bus such as a Serial Peripheral Interface (SPI)) in such a way that a user does not have to encode and/or generate text-based scripts generate messages to be sent on the I2C bus to the sensor or decode messages received from the sensor via the serial bus during testing of the sensor (e.g., a camera).

Figure 2:
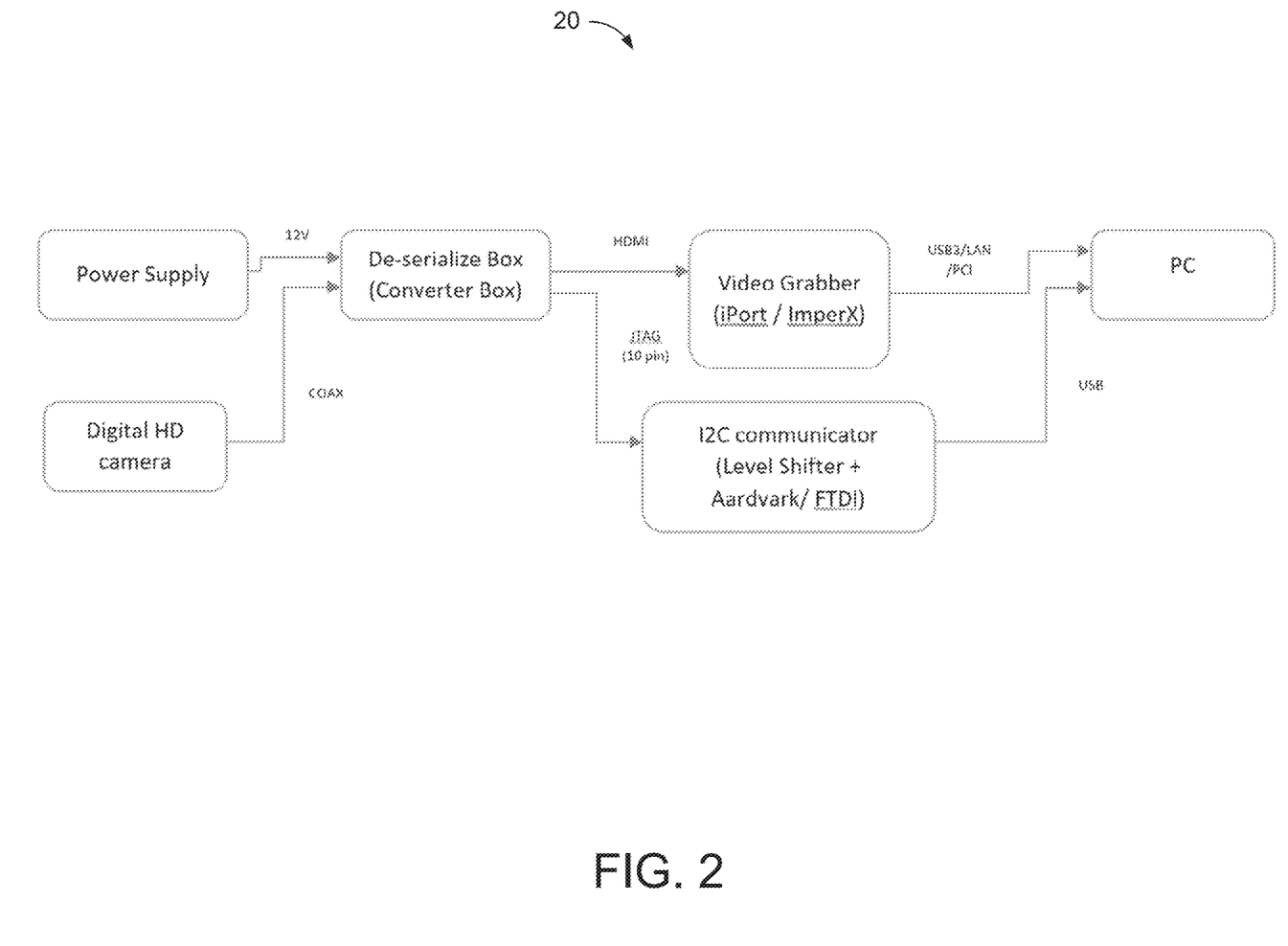
FIG. 2 is schematic view of test station in accordance with the present invention.
Figure 3:
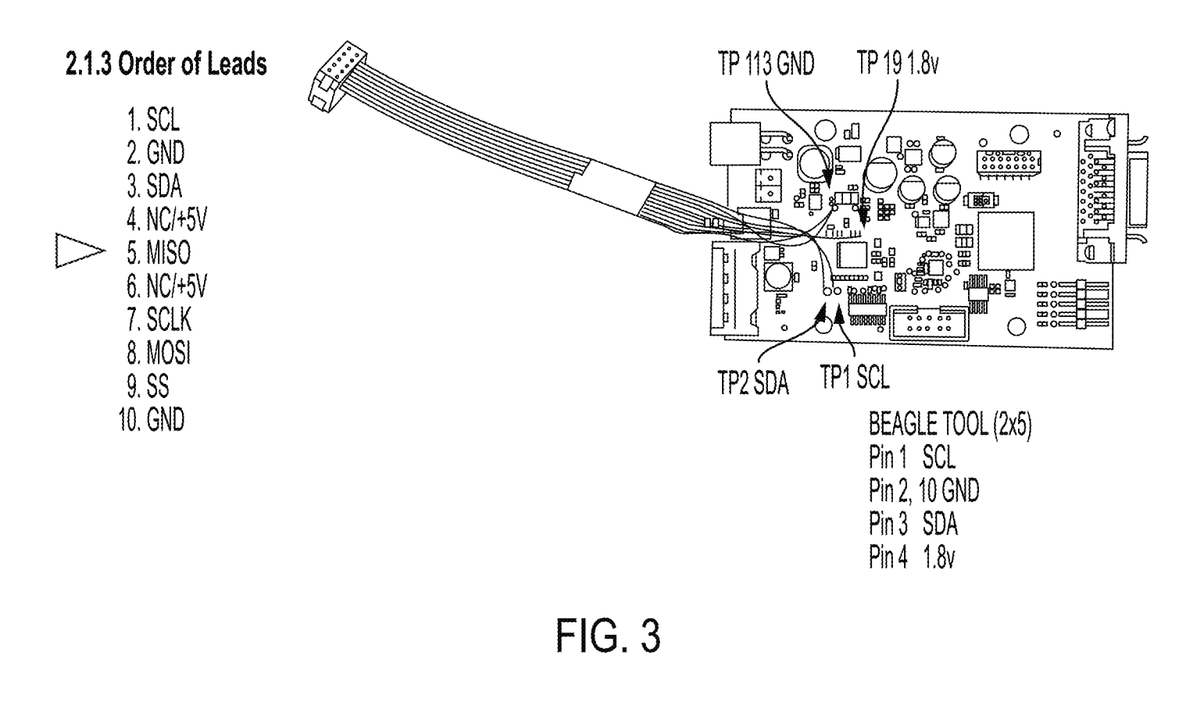
FIG. 3 is a perspective view of a I2C host adapter of the test station of FIG. 1.
Figure 4A:
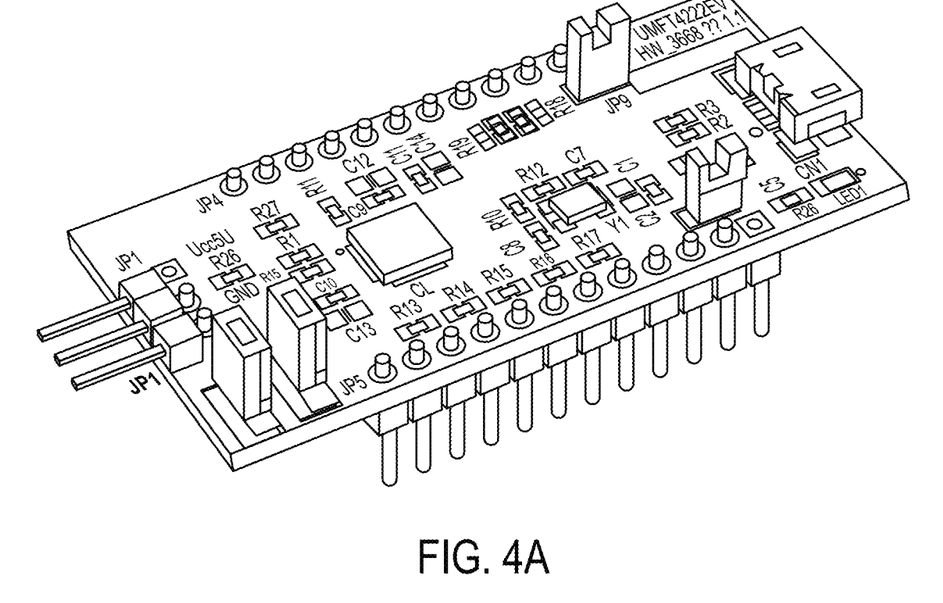
FIG. 4A is a perspective view of a control board of the test station of FIG. 1.
Figure 4B:
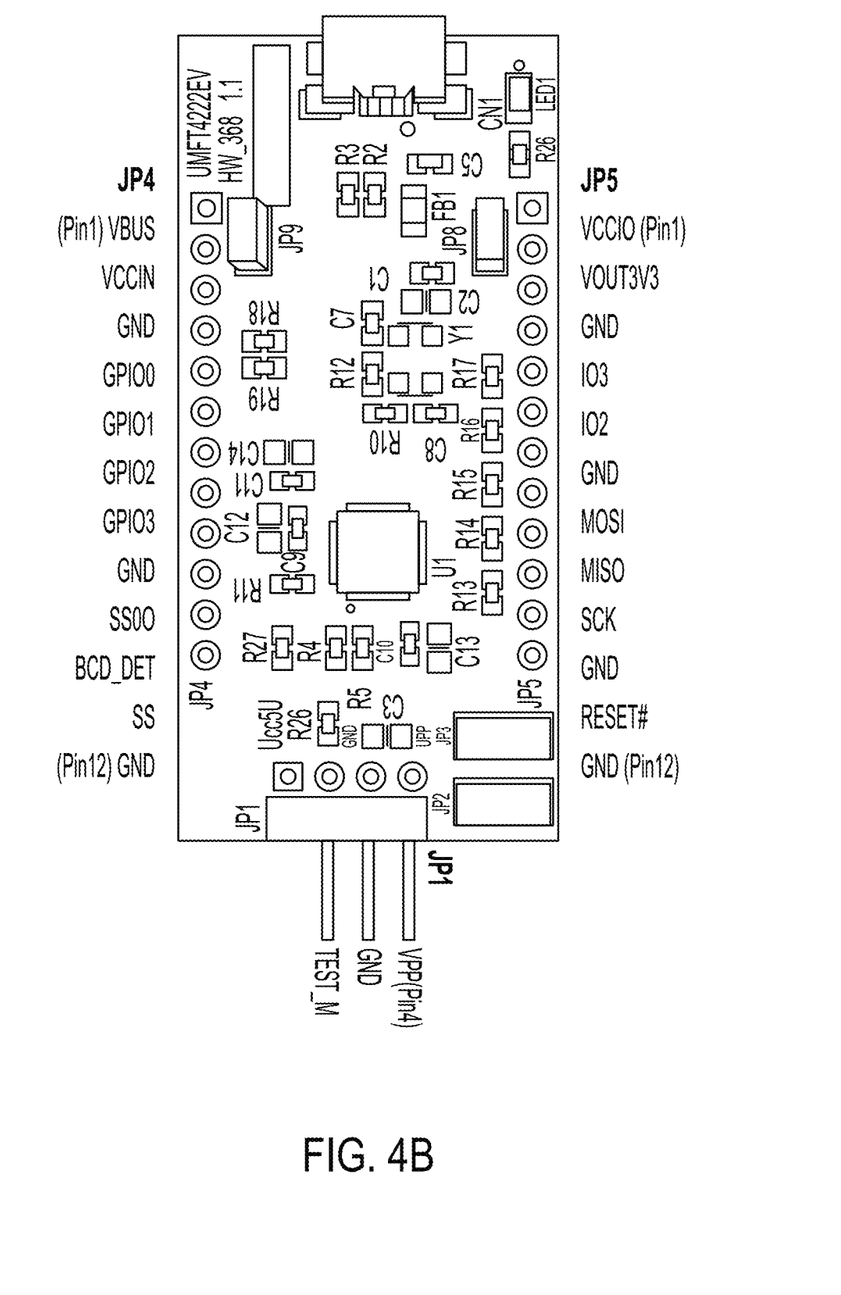
FIG. 4B is a schematic view of the control board of FIG. 4A.

Referring now to FIG. 2, an exemplary test station 20 includes a device under test (DUT) (e.g., the digital HD camera or other sensor) connected (e.g., via a coaxial connection) to a converter box that may include a de-serializer to de-serialize an output of the DUT. The de-serializer and/or camera may be powered by a power supply. The converter box may also include a serializer to serialize data transmitted (e.g., via wireless or wired transmission) to the device under test (e.g., commands). The de-serialized sensor data, such as image data, is provided (e.g., via High-Definition Multimedia Interface (HDMI)) to a video grabber. The video grabber (i.e., a frame grabber) may be, for example, hardware and/or a software application executed by a computing device (e.g., a desktop, laptop, tablet, mobile phone, etc.) that stores frames of image data captured by a camera. The video grabber may be separate hardware that instead communicates with the computing device via a wired or wireless connection. Control and status information may be provided via a Joint Test Action Group (JTAG) connection to an Inter-Integrated Circuit (I2C) communicator or host adapter (FIG. 3). The video grabber and I2C host adapter may both communicate with a user device, such as a personal computer (PC) via, for example, a Universal Serial Bus (USB) connection. A control board (FIGS. 4A and 4B) may also be connected via a JTAG connection to the camera.

Figure 5A:
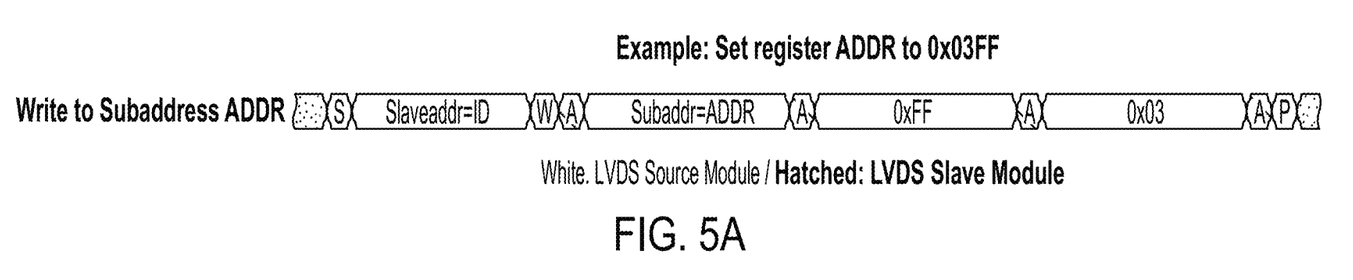
FIGS. 5A and 5B are schematic views of exemplary I2C messages.
Figure 5B:
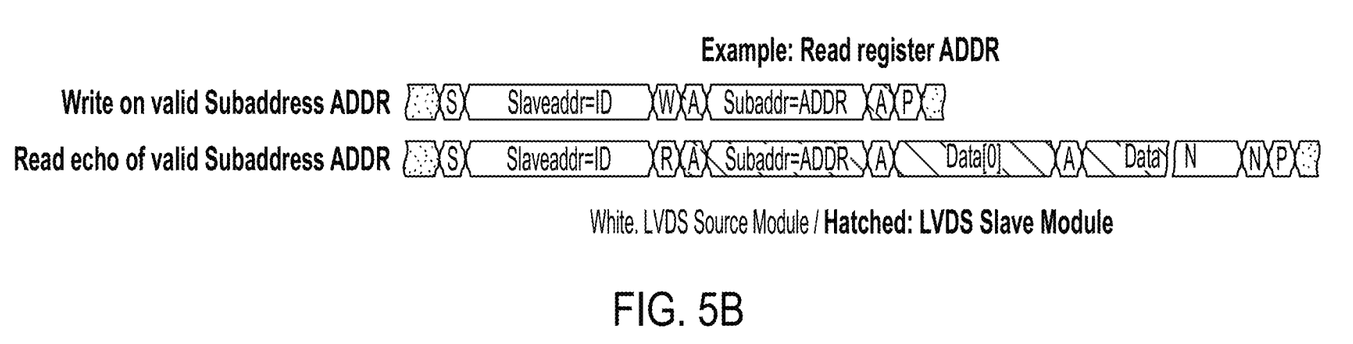
Figure 6A:
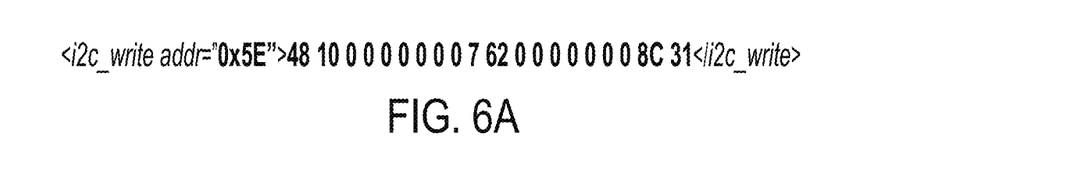
FIGS. 6A-6D are schematic views of test scripts and test generation interfaces in accordance with the present invention.
Figure 6B:
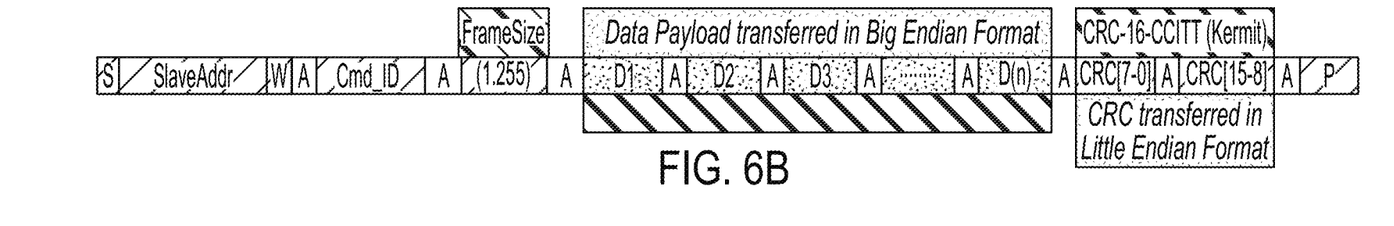
Figure 6C:
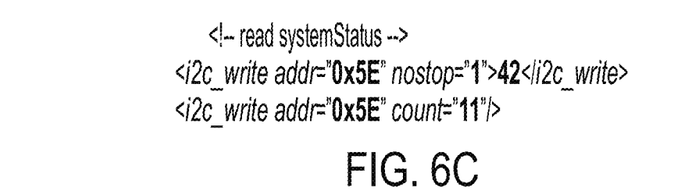
Figure 6D:
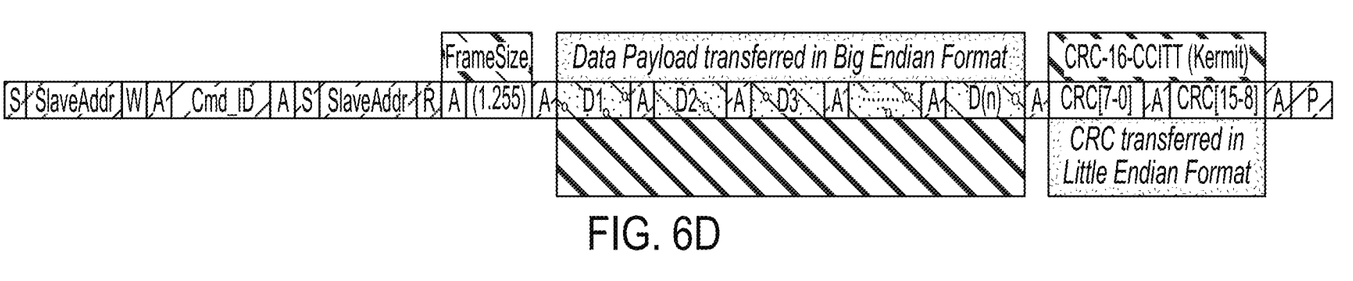

With the test station 20, a user may define (using the test generation interface, as described in more detail below) and use a variety of test cases for a variety of different sensors that use the same testing interface (e.g., I2C). Test cases may indicate key words or labels to describe a communication or message (e.g., "read" for reading a value or "write" for writing a value). The system may formulate a structure for each message based on the protocol being used (e.g., I2C) automatically. For example, referring to FIGS. 5A and 5B, the system may formulate an I2C message that includes a write to slave sub-address without Cyclic Redundancy Check (CRC) (FIG. 5A) and an I2C read from a slave sub-address with non-repeat start (i.e., a stop bit is transmitted at the end of the write and then a read start bit is transmitted) (FIG. 5B). Referring now to FIGS. 6A-6D, a test script (FIG. 6A) may be generated to indicate the write (FIG. 5A) via a test generation interface (FIG. 6B). Similarly, a test script (FIG. 6C) may be generated to indicate the read (FIG. 5B) via the same or a different test generation interface (FIG. 6D).

Figure 7:
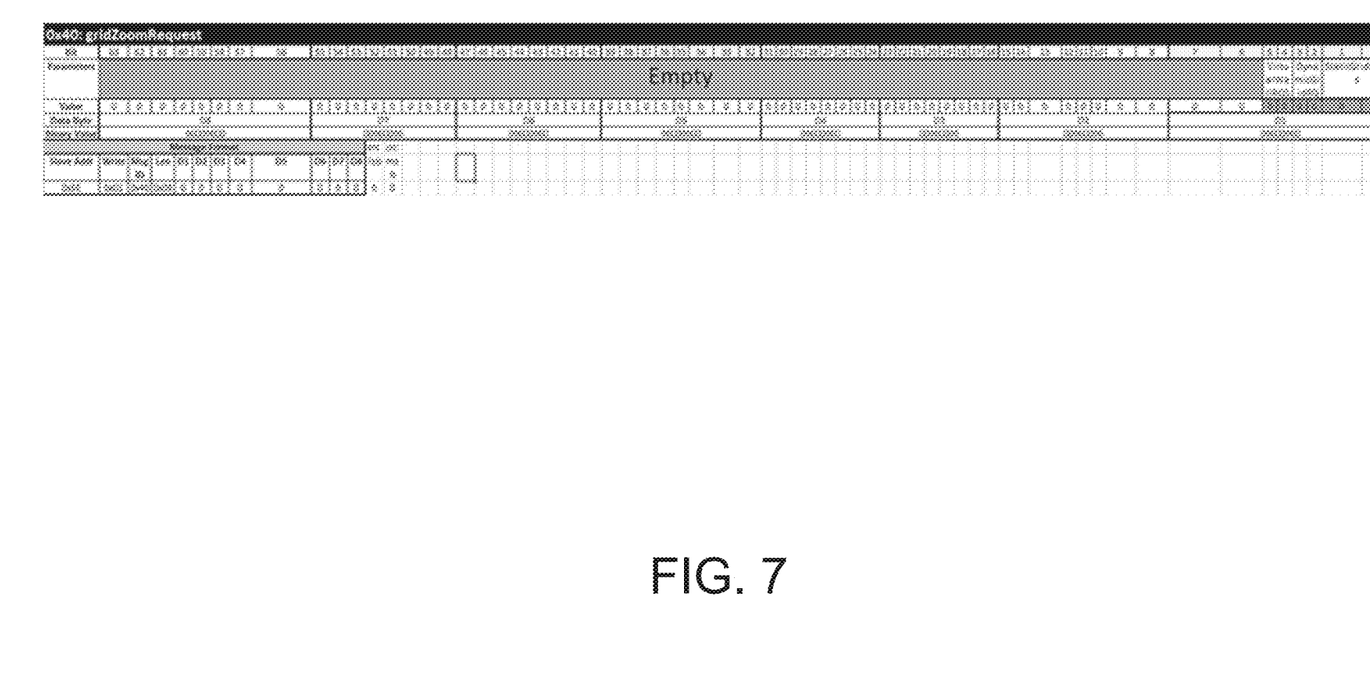
FIG. 7 is a schematic view of a test generation interface in accordance with the present invention.

FIG. 7 illustrates an exemplary test generation interface that executes on data processing hardware (e.g., a processor and memory of the PC). For example, the PC (or other user device such as a laptop, tablet, smartphone, etc.) may display on a display the test generation interface and accept user input (e.g., via a keyboard and mouse, touch screen, etc.). The test generation interface uses the user input to generate (via the data processing hardware) test scripts (FIGS. 6A and 6C) for the test station 20. The test script may separate inputs to formulate the structure of each message. The test generation interface may define a number of parameters. For example, a slave address, message length, CRC type, command type (e.g., read/write), message identification (ID), repeat start, speed (e.g., I2C communication speed), and endianness may all be configurable parameters. The test generation interface may encode and decode messages based on the parameters. Each parameter may initially be assigned a default value. The user may modify the parameters (e.g., via a configuration file or any other means). Any required CRC may be calculated in real time and sent along with the message (e.g., embedded 16-bit CRC according to the Consultative Committee for International Telephony and Telegraphy standard (CRC 16-CCITT)). Alternatively, no CRC may be used. A message packer may properly configure the endianness of the message payload. For example, the message payload may be transferred in big endian format (i.e., most significant byte to least significant byte). The message CRC may be transferred in little endian format (i.e., least significant byte to most significant byte).

The test generation interface may include a number of fields that a user may interact with to craft messages. The test generation interface provides a level of abstraction that allows the user to easily and repeatedly generate specific messages with specific payloads without the need to understand the specifics of the underlying serial protocol. For example, the test generation interface has a field for defining the transaction type (e.g., read, write, etc.), a field for an address (e.g., where to read or write), and a field for data payload (i.e., what data the message should convey). The user may be able to assign each message with a unique name or label so that the exact message may be easily recalled/reused and the message may be duplicated any number of times across any number of tests.

Figure 8:
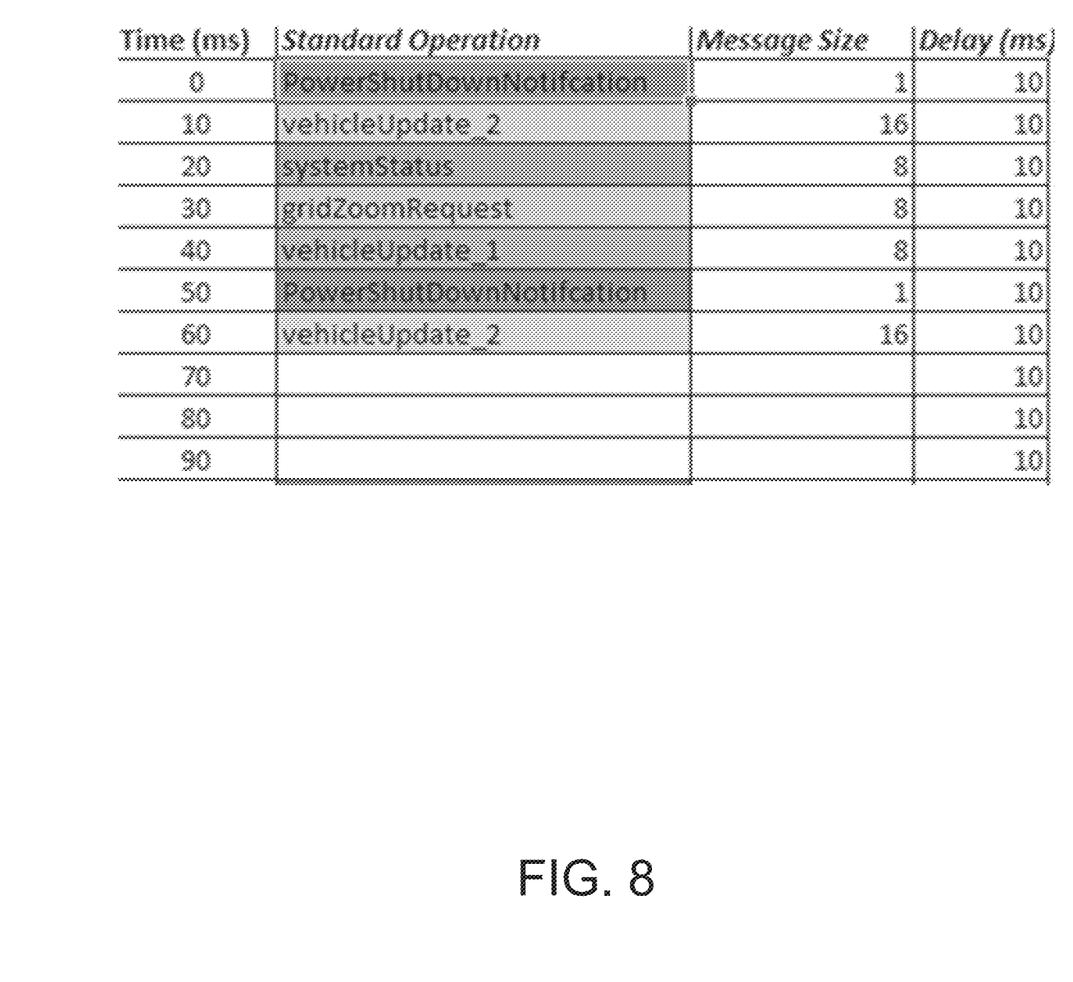
FIG. 8 is a schematic view of a scheduler in accordance with the present invention.

Referring now to FIG. 8, the test generation interface may include a scheduler to schedule a plurality of messages. The scheduler may ensure the messages are sent in a specified order. The scheduler may insert a configurable delay between each message. For example, the user may indicate that a 10 ms should be inserted between the transmission of a first message and a second message and a 20 ms delay should be inserted between the second message and a third message. This value may be adjusted based on the specifics of the sensor under test, the test, environmental conditions, or for any other reason. The test generation interface may have an input for raw I2C messages (i.e., the user may input raw I2C data to be sent to the sensor under test). The generated test scripts may be executed to allow for automated test runs. Sensor output may be monitored (e.g., via the video grabber/a display/the PC) during testing and in response to test commands sent from the test station. The test generation interface, after configuration, and the test script may be stored in non-volatile memory (e.g., a database) for easy recreation of the testing parameters. Optionally, all signals from a given source may be stored in a database container (DBC) file (i.e., an ASCII based translation file).

Thus, vehicular sensor (e.g., camera) testing system provides a test generation interface to allow a user to quickly and easily generate tests by creating messages to transmit (via wired or wireless transmission) to the sensor via a serial protocol. The system transforms the user input (via the test generation interface) into a test script that includes the appropriate messages to transmit (via wired communication such as I2C or wireless communication) to the sensor and receives (via wired or wireless communication) and decodes messages from the sensor. The system may log and/or display the received messages in an easily-digestible format for the user.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for testing a sensor of a vehicular sensing system, the method comprising:

displaying, by a processor of a user device, a test generation interface on a display screen of the user device, wherein the test generation interface comprises a plurality of fields;

receiving, at the processor, a user input based on a user interacting with the test generation interface, wherein the user input comprises a user entry for each field of the plurality of fields, and wherein a field of the plurality of fields comprises a configurable delay field;

determining, by the processor, and based on the received user input, a plurality of parameters of at least one system test, wherein each parameter of the plurality of parameters is based on a particular user entry of one of the fields of the plurality of fields, and wherein a parameter of the plurality of parameters comprises a configurable delay parameter, and wherein the configurable delay parameter is based on the user entry for the configurable delay field;

generating, by the processor, a test script based on the determined plurality of parameters of the at least one system test, wherein the test script comprises at least one test message for performing the at least one system test, and wherein the at least one test message comprises the plurality of parameters based on the received user input;

transmitting, by the processor, the generated test script to a host adapter in communication with the sensor of the vehicular sensing system;

responsive to receiving the generated test script, transmitting, by the host adapter, the at least one test message to the sensor of the vehicular sensing system to test the sensor of the vehicular sensing system;

wherein the test generation interface comprises a scheduler, and wherein the scheduler schedules a plurality of messages corresponding to the determined plurality of parameters; and wherein the scheduler inserts a delay between each message transmission based on the configurable delay parameter.

2. The method of claim 1, wherein the host adapter comprises an Inter-Integrated Circuit (I2C) host adapter.

3. The method of claim 1, wherein the determined plurality of parameters comprises at least one selected from the group consisting of (i) a slave address, (ii) a message length, (iii) a cyclic redundancy check (CRC) type, (iv) a command type, (v) a message ID, (vi) a speed, and (vii) an endianness.

4. The method of claim 1, wherein the host adapter is in communication with a converter box that de-serializes communications received from the sensor and serializes communications transmitted to the sensor.

5. The method of claim 1, wherein sensor data transmitted by the sensor is displayed at the display screen during testing of the sensor.

6. The method of claim 1, wherein the test script defines a plurality of messages, and wherein generating the test script comprises generating a CRC for each message of the plurality of messages.

7. The method of claim 1, wherein each parameter of the determined plurality of parameters comprises a default value.

8. The method of claim 1, wherein the sensor comprises a vehicular camera, and wherein the vehicular sensing system comprises a vehicular vision system.

9. The method of claim 8, further comprising, receiving, at a frame grabber, image data captured by the vehicular camera responsive to the at least one test message, and displaying, by the frame grabber, the captured image data on the display screen.

10. A method for testing a sensor of a vehicular sensing system, the method comprising:
    displaying, by a processor of a user device, a test generation interface on a display screen of the user device, wherein the test generation interface comprises a plurality of fields;
    receiving, at the processor, a user input based on a user interacting with the test generation interface, wherein the user input comprises a user entry for each field of the plurality of fields, and wherein a field of the plurality of fields comprises a configurable delay field;
    determining, by the processor, and based on the received user input, a plurality of parameters of at least one system test, wherein each parameter of the plurality of parameters is based on a particular user entry of one of the fields of the plurality of fields, and wherein the determined plurality of parameters comprises at least one selected from the group consisting of (i) a slave address, (ii) a message length, (iii) a cyclic redundancy check (CRC) type, (iv) a command type, (v) a message identification, (vi) a speed, and (vii) an endianness, and wherein a parameter of the plurality of parameters comprises a configurable delay parameter, and wherein the configurable delay parameter is based on the user entry for the configurable delay field;
    generating, by the processor, a test script based on the determined plurality of parameters of the at least one system test, wherein the test script comprises at least one test message for performing the at least one system test, and wherein the at least one test message comprises the plurality of parameters based on the received user input;
    transmitting, by the processor, the generated test script to an Inter-Integrated Circuit (I2C) adapter in communication with the sensor of the vehicular sensing system;
    responsive to receiving the generated test script, transmitting, by the I2C adapter, the at least one test message to the sensor of the vehicular sensing system to test the sensor of the vehicular sensing system;
    wherein the test generation interface comprises a scheduler, and wherein the scheduler schedules a plurality of messages corresponding to the determined plurality of parameters; and
    wherein the scheduler inserts a delay between each message transmission based on the configurable delay parameter.

11. The method of claim 10, wherein the I2C adapter is in communication with a converter box that de-serializes communications received from the sensor and serializes communications transmitted to the sensor.

12. The method of claim 10, wherein sensor data transmitted by the sensor is displayed at the display screen during testing of the sensor.

13. A method for testing a sensor of a vehicular sensing system, the method comprising:
    displaying, by a processor of a user device, a test generation interface on a display screen of the user device, wherein the test generation interface comprises a plurality of fields;
    receiving, at the processor, a user input based on a user interacting with the test generation interface, wherein the user input comprises a user entry for each field of the plurality of fields, and wherein a field of the plurality of fields comprises a configurable delay field;
    determining, by the processor, and based on the received user input, a plurality of parameters of at least one system test, wherein each parameter of the plurality of parameters is based on a particular user entry of one of the fields of the plurality of fields, and wherein each parameter of the determined plurality of parameters comprises a default value, and wherein a parameter of the plurality of parameters comprises a configurable delay parameter, and wherein the configurable delay parameter is based on the user entry for the configurable delay field;
    generating, by the processor, a test script based on the determined plurality of parameters of the at least one system test, wherein the test script comprises a plurality of test messages for performing the at least one system test, and wherein the plurality of test messages comprises the plurality of parameters based on the received user input;
    transmitting, by the processor, the generated test script to a host adapter in communication with the sensor of the vehicular sensing system;
    responsive to receiving the generated test script, transmitting, by the host adapter, the plurality of test messages to the sensor of the vehicular sensing system to test the sensor of the vehicular sensing system, wherein the test generation interface comprises a scheduler, and wherein the scheduler schedules the plurality of test messages corresponding to the determined plurality of parameters;
    wherein the scheduler inserts a delay between each message transmission based on the configurable delay parameter.

14. The method of claim 13, wherein the host adapter comprises an Inter-Integrated Circuit (I2C) host adapter.

15. The method of claim 13, wherein the determined plurality of parameters comprises at least one selected from the group consisting of (i) a slave address, (ii) a message length, (iii) a cyclic redundancy check (CRC) type, (iv) a command type, (v) a message identification, (vi) a speed, and (vii) an endianness.

16. The method of claim 13, wherein the host adapter is in communication with a converter box that de-serializes communications received from the sensor and serializes communications transmitted to the sensor.

* * * * *

UNITED STATES PATENT AND TRADEMARK OFFICE
CERTIFICATE OF CORRECTION

| | | |
|---|---|---|
| PATENT NO. | : 12,117,957 B2 | Page 1 of 1 |
| APPLICATION NO. | : 17/249040 | |
| DATED | : October 15, 2024 | |
| INVENTOR(S) | : Jaidev Khatri | |

It is certified that error appears in the above-identified patent and that said Letters Patent is hereby corrected as shown below:

In the Claims

<u>Column 8</u>
Line 56, Claim 13, "parameters;" should be --parameters; and--

Signed and Sealed this
Twelfth Day of November, 2024

Katherine Kelly Vidal
*Director of the United States Patent and Trademark Office*